(12) United States Patent
Jiang et al.

(10) Patent No.: US 11,002,994 B2
(45) Date of Patent: *May 11, 2021

(54) HEAD MOUNT DISPLAYS FOR MIXED REALITY

(71) Applicant: Intel Corporation, Santa Clara, CA (US)

(72) Inventors: Jun Jiang, Portland, OR (US); Zhiming Zhuang, Sammamish, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,844

(22) Filed: Aug. 29, 2019

(65) Prior Publication Data

US 2020/0124880 A1 Apr. 23, 2020

Related U.S. Application Data

(63) Continuation of application No. 15/863,271, filed on Jan. 5, 2018, now Pat. No. 10,401,657.

(51) Int. Cl.
*G02F 1/01* (2006.01)
*G02B 27/01* (2006.01)
*G02B 5/30* (2006.01)

(52) U.S. Cl.
CPC ............. *G02F 1/0136* (2013.01); *G02B 5/30* (2013.01); *G02B 27/017* (2013.01);
(Continued)

(58) Field of Classification Search
CPC ... G02F 1/0136; G02B 27/283; G02B 27/286; G02B 30/25; G02B 6/272; G02B 5/30;
(Continued)

(56) References Cited

U.S. PATENT DOCUMENTS 9,367,128 B2 6/2016 Ko et al.
10,401,657 B2 * 9/2019 Jiang .................... G02F 1/0136
(Continued)

OTHER PUBLICATIONS

Toorlabs, Inc. (1999-2017) Half-Wave Liquid Crystal Variable Retarders / Wave Plates. Retrieved on May 15, 2018 from URL <<https://www.thorlabs.com/newgrouppage9.cfm?objectgroup_id=6179>> 4 pages.
(Continued)

*Primary Examiner* — Mohammed A Hasan
(74) *Attorney, Agent, or Firm* — Schwabe, Williamson & Wyatt, P.C.

(57) ABSTRACT

Apparatus, systems, or methods for mixed reality are disclosed herein. An apparatus may include an optical structure, a display structure, and a controller coupled to the optical structure and the display structure. The optical structure may be controlled by a first electrical signal to act as a transparent glass to present a natural view, or to act as a magnifying glass to present a virtual view. The display structure may be controlled by a second electrical signal to act as an opaque display or a transparent display. In addition, the controller may control the apparatus to operate in at least an AR mode to interlace the natural view and the virtual view. Other embodiments may also be described and claimed.

25 Claims, 10 Drawing Sheets

(52) U.S. Cl.
CPC .... *G02B 27/0172* (2013.01); *G02B 2027/014* (2013.01); *G02B 2027/0123* (2013.01)

(58) Field of Classification Search
CPC .............. G02B 27/017; G02B 27/0172; G02B 2027/014; G02B 2027/0123
USPC ........................................................ 359/246
See application file for complete search history.

(56) References Cited

U.S. PATENT DOCUMENTS

| | | |
|---|---|---|
| 2006/0152812 A1 | 7/2006 | Woodgate et al. |
| 2018/0275410 A1* | 9/2018 | Yeoh .................... H04N 13/344 |
| 2018/0284464 A1* | 10/2018 | Lu ....................... G02B 27/0093 |
| 2018/0356639 A1* | 12/2018 | Schaefer ............... G02F 1/1326 |

OTHER PUBLICATIONS

Office Action dated Dec. 26, 2018 for U.S. Appl. No. 15/863,271, 15 pages.

\* cited by examiner

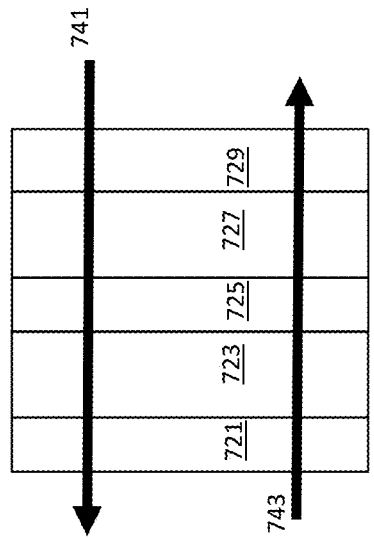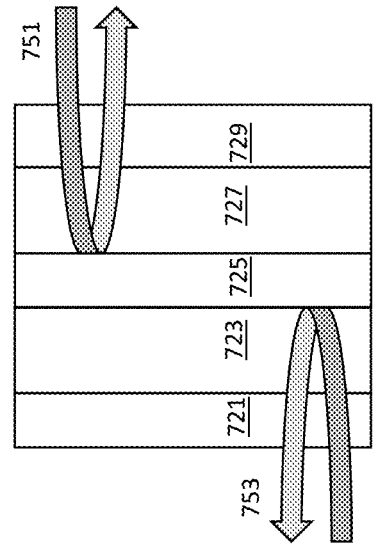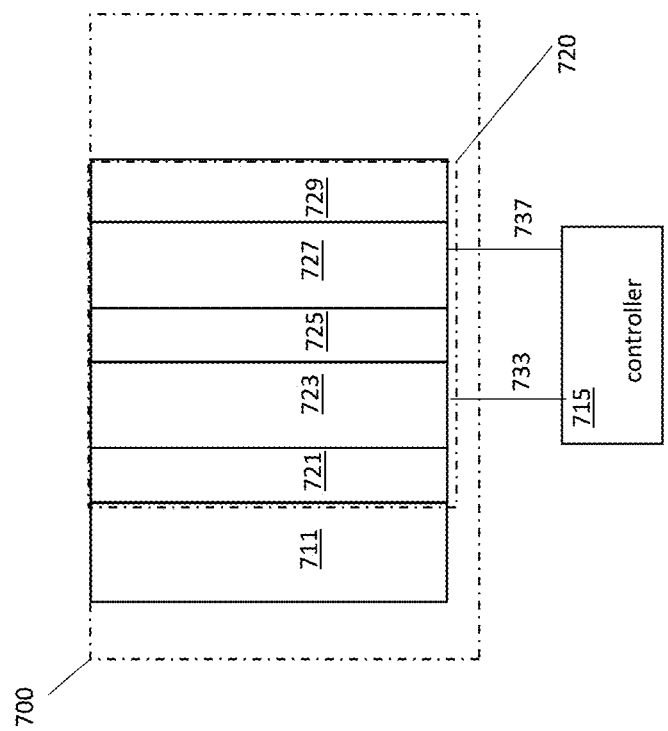

HEAD MOUNT DISPLAYS FOR MIXED REALITY

CROSS REFERENCE TO RELATED APPLICATIONS

The present application is a Continuation of U.S. application Ser. No. 15/863,271, filed on Jan. 5, 2018 entitled "HEAD MOUNT DISPLAYS FOR MIXED REALITY", the contents of which is hereby incorporated by reference in its entirety.

FIELD

Embodiments of the present disclosure relate generally to the technical fields of mixed reality, including augmented reality and virtual reality, and more particularly to head mount displays for mixed reality.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Mixed reality (MR) or hybrid reality, encompassing both augmented reality (AR) and virtual reality (VR), merges real and virtual worlds to produce new environments and visualizations where physical and digital objects co-exist and interact in real time. Traditionally, VR views or AR views may be achieved with the aid of a VR head mount display (HMD) or an AR HMD respectively. Since a VR HMD and an AR HMD may have different requirements on optical systems each uses, it may be difficult to achieve both VR views and AR views by a current VR HMD or a current AR HMD alone. A VR HMD may block natural views of a user to create immersive experience. In addition, a VR HMD may rely on high power magnifier-like optics to achieve wide field of view (FOV) for virtual images, which may distort the natural views. On the other hand, an AR HMD may require unblocked natural views. Augmented views of the natural views may be achieved in a limited portion of the natural views to alter a user's natural views. In addition, the augmented views of an AR HMD may typically have a small FOV. Some existing approaches for a HMD to be used in both VR and AR may rely on some simple mechanical flip up/flip down mechanisms that allow a user to quickly move the display in and out of their line of sight, which is not suitable for great users experiences.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 7A-7C illustrate example diagrams of another display structure of an apparatus for mixed reality to operate in an AR mode or a VR mode, in accordance with various embodiments.

DETAILED DESCRIPTION

Figure 1:
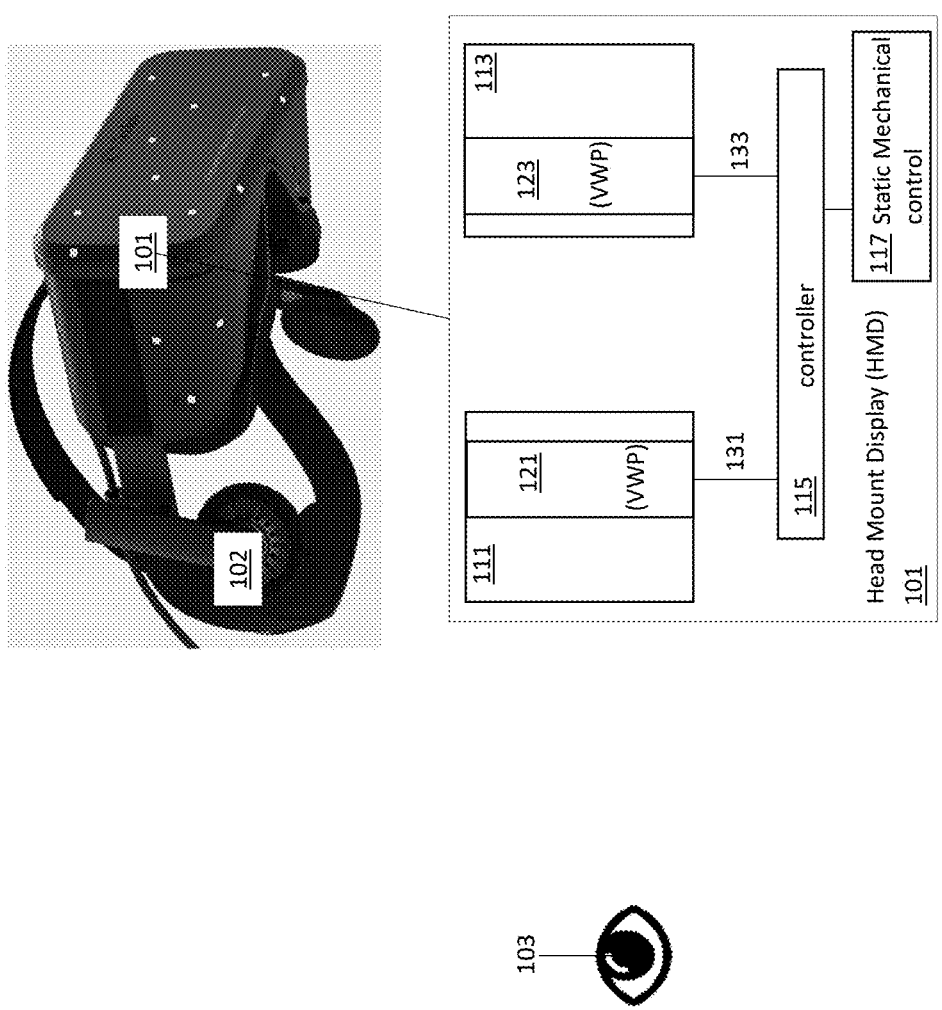
FIG. 1 illustrates an example apparatus for mixed reality including an optical structure, a display structure, and a controller to control the apparatus to operate in an augmented reality (AR) mode or a virtual reality (VR) mode, in accordance with various embodiments.

Augmented reality (AR) or virtual reality (VR) may be achieved with the aid of an AR head mount display (HMD) or a VR HMD respectively. VR optical systems may use a magnifier lens or magnifying glass to generate a much enlarged virtual view at a far distance with a wide field of view (FOV) for a user. The magnifying glass may not be used in a natural view for a user since the optical power of the magnifying glass may alter the natural view of the user. A conventional AR HMD may use an optical system to provide both natural views and superposed augmented views. In addition, an AR HMD may be compact, which may limit the depth of an AR optical system to have a narrow FOV.

Mixed reality (MR) or hybrid reality may include both AR and VR, which may possess conflicting requirements for the optical systems. Some current MR HMD may rely on some simple mechanical flip up/flip down mechanisms. A user may flip the optical system down to obtain VR views and may flip the optical system up so it will not block a user's natural views. Such mechanical control may totally rely on a user's action, which may not be suitable for great users experiences. Embodiments herein may present a MR apparatus, which may be a MR HMD, that can accommodate both VR views and AR views with wide FOV, through a same set of optical structure. The switching between an AR mode and a VR mode may be controlled by electrical signals or electro-mechanical signals, which may provide more flexible control based on a user's intention or scene based scenario for switching between the AR mode and the VR mode. Embodiments herein may achieve great user experiences.

In embodiments, an apparatus for MR may include an optical structure, a display structure, and a controller coupled to the optical structure and the display structure. The optical structure may include a first variable wave plate, and the display structure may include a second variable wave plate. The optical structure may be controlled by a first electrical signal to act as a transparent glass to present a natural view, or to act as a magnifying glass to present a virtual view. The display structure may be controlled by a second electrical signal to act as an opaque display or a transparent display. In addition, the controller may control the apparatus to operate in at least an AR mode to interlace the natural view and the virtual view.

In embodiments, a method for operating an apparatus for MR may include: presenting, in a VR mode, a virtual view by an optical structure of the apparatus, and controlling a display structure of the apparatus to act as an opaque display. In addition, the method may include: controlling the optical structure, in an AR mode, to present a natural view for a first time period, followed by the virtual view for a second time period, and controlling the display structure to act as a transparent display. The optical structure may include a first variable wave plate, and the display structure may include a second variable wave plate. The optical structure may be controlled by a first electrical signal to act as a transparent glass to present the natural view, or to act as a magnifying glass to present the virtual view. The display structure may be controlled by a second electrical signal to act as the opaque display or the transparent display.

In embodiments, an apparatus for MR may include an optical structure and a controller coupled to the optical structure. The optical structure may include a variable wave plate. The optical structure may be controlled by an electrical signal to act as a transparent glass to present a natural view, or to act as a magnifying glass to present a virtual view. The controller may control the optical structure, by the electrical signal, to interlace the natural view and the virtual view by presenting the natural view for a first time period, followed by the virtual view for a second time period.

In the description to follow, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), autonomous or semi-autonomous driving vehicle (hereinafter, simply ADV) systems, in-vehicle navigation systems, electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates an example apparatus 101 for MR including an optical structure 111, a display structure 113, and a controller 115 to control the apparatus 101 to operate in an AR mode or a VR mode, in accordance with various embodiments. For clarity, features of the apparatus 101, the optical structure 111, the display structure 113, and the controller 115 may be described below as an example for understanding an apparatus for MR, an optical structure, a display structure, and a controller. It is to be understood that there may be more or fewer components included in the apparatus 101, the optical structure 111, the display structure 113, and the controller 115. Further, it is to be understood that one or more of the devices and components within the apparatus 101, the optical structure 111, the display structure 113, and the controller 115 may include additional and/or varying features from the description below, and may include any devices and components that one having ordinary skill in the art would consider and/or refer to as an apparatus for MR, an optical structure, a display structure, and a controller. The apparatus 101 for MR may be a HMD. In some other embodiments, the apparatus 101 for MR may be referred to as a different name, or used in different part of a MR system.

In embodiments, the apparatus 101 for MR may be attached to a stripe 102 that may be affixed to a human head. In some other embodiments, the stripe 102 may be replaced by some other mechanisms to affix the apparatus 101 to a human body. In detail, the apparatus 101 may include the optical structure 111, the display structure 113, the controller 115 coupled to the optical structure 111 and the display structure 113, and a static mechanical control 117. The optical structure 111 may be placed between a human eye 103 and the display structure 113. The optical structure 111 may be coupled to the controller 115 by an electrical signal 131, while the display structure 113 may be coupled to the controller 115 by an electrical signal 133. In addition, the static mechanical control 117 may be coupled to the controller 115 to provide additional control to switch the apparatus 101 from operating in an AR mode to a VR mode, or from operating in a VR mode to an AR mode.

In embodiments, the optical structure 111 may be controlled by the electrical signal 131 to act as a transparent glass to present a natural view, or to act as a magnifying glass to present a virtual view. The optical structure 111 may include a variable wave plate (VWP) 121, which may be controlled by the electrical signal 131. In addition, the optical structure 111 may include another VWP. The optical structure 111 may act as a magnifying glass to present a virtual view when the VWP 121 and another VWP may be set to quarter wave phase, controlled by the electrical signal 131. On the other hand, the optical structure 111 may act as a transparent glass to present a natural view when the VWP 121 and another VWP may be set to half wave phase, controlled by the electrical signal 131. More details of a VWP may be shown in FIG. 2.

In embodiments, the display structure 113 may be controlled by the electrical signal 133 to act as an opaque display or a transparent display. In detail, the display structure 113 may include a VWP 123, which may be controlled by the electrical signal 133. The display structure 113 may act as a transparent display when the VWP 123 may be set to 0 wave phase by the electrical signal 133. On the other hand, the display structure 113 may act as an opaque display when the VWP 123 may be set to half wave phase by the electrical signal 133.

In embodiments, the controller 115 may control the apparatus 101 to operate in an AR mode or a VR mode. When the apparatus 101 is to operate in a VR mode, the controller 115 may control the optical structure 111 by the electrical signal 131 to present a virtual view, and control the display structure 113 by the electrical signal 133 to act as an opaque display.

In addition, when the apparatus 101 is to operate in an AR mode, the controller 115 may control the optical structure 111 by the electrical signal 131 to interlace a natural view and a virtual view by presenting the natural view for a first time period, followed by the virtual view for a second time period. More details of the interlacing the natural view and the virtual view may be presented in FIG. 3. At the meantime, the controller 115 may control the display structure 113 by the electrical signal 133 to act as a transparent display. Furthermore, the controller 115 may synchronize the electrical signal 131 for the optical structure 111 to interlace the natural view and the virtual view, and the electrical signal 133 for the display structure 113 to act as a transparent display.

In embodiments, the controller 115 may switch the apparatus 101 from operating in an AR mode to a VR mode, or from operating in a VR mode to an AR mode. The controller 115 may switch the apparatus 101 between an AR mode and a VR mode by electrical signals based on a user's intention, scene based scenario, or some predetermined programs operated by the controller 115. In addition, the apparatus 101 may be switched between an AR mode and a VR mode by electro-mechanical signals determined by the static mechanical control 117. For example, the static mechanical control 117 may be a button, and a user may push the button to switch from an AR mode to a VR mode. Once the static mechanical control 117 is pushed, an electrical signal may be generated by the controller 115 to switch the apparatus 101 from an AR mode to a VR mode. Hence, the static mechanical control 117 may switch the apparatus 101 from operating in an AR mode to a VR mode, or from operating in a VR mode to an AR mode, based on electro-mechanical signals. Such electro-mechanical signals may be more flexible than the simple mechanical flip up/flip down mechanisms used on some current HMDs. Such flexible control for switching the apparatus 101 from operating in the AR mode to the VR mode may achieve great user experiences.

Figure 2B:
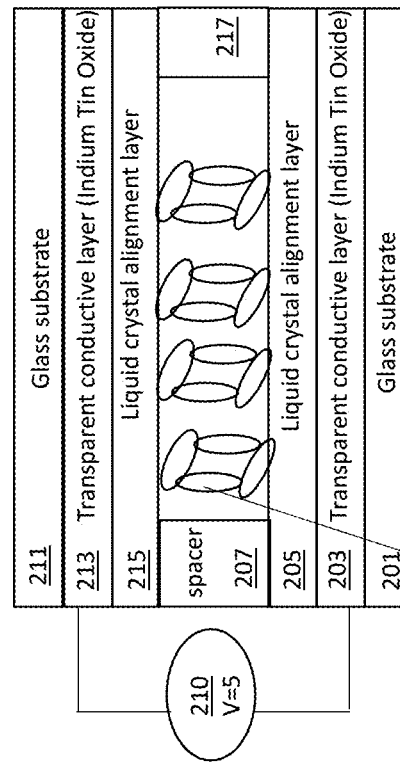
FIGS. 2A-2B illustrate example diagrams of a variable wave plate included in an optical structure or a display structure of an apparatus for mixed reality to control an AR mode or a VR mode, in accordance with various embodiments.
Figure 2A:
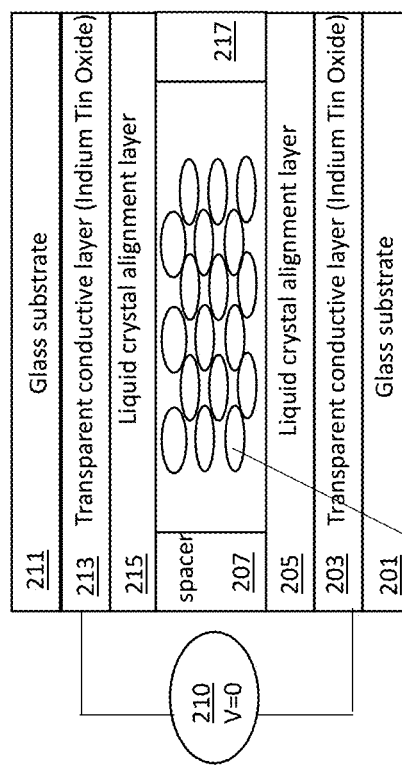

FIGS. 2A-2B illustrate example diagrams of a VWP 200 included in an optical structure or a display structure of an apparatus for MR to control an AR mode or a VR mode, in accordance with various embodiments. In embodiments, the VWP 200 may be similar to the VWP 121 included in the optical structure 111, or similar to the VWP 123 included in the display structure 113 as shown in FIG. 1. FIG. 2A illustrates the VWP 200 in high retardance state, while FIG. 2B illustrates the VWP 200 in low retardance state, which may represent the degrees of angular shift in the phase of incoming polarized light.

In embodiments, as shown in FIGS. 2A-2B, the VWP 200 may include a liquid crystal based device. In more detail, the VWP 200 may include a glass substrate 201 and a glass substrate 211 at a top layer and a bottom layer of the VWP 200. A transparent conductive layer 203 may be next to the glass substrate 201, and a transparent conductive layer 213 may be next to the glass substrate 211, where the transparent conductive layer 203 and the transparent conductive layer 213 may include indium tin oxide. In addition, a liquid crystal alignment layer 205 may be next to the transparent conductive layer 203, while a liquid crystal alignment layer 215 may be next to the transparent conductive layer 213. A spacer 207 and a spacer 217 may be placed between the liquid crystal alignment layer 205 and the liquid crystal alignment layer 215 to surround liquid crystal molecules, e.g., a liquid crystal molecule 221. In their nematic phase, liquid crystal molecules, e.g., a liquid crystal molecule 221, may have an ordered orientation, When an electric field may be applied by a voltage 210 coupled to the transparent conductive layer 203 and the transparent conductive layer 213, the multiple liquid crystal molecules may align to the electric field and the level of birefringence may be controlled by the tilting of the liquid crystal molecules. Accordingly, the VWP 200 may act as a 0 wave, quarter wave, half wave plate, or a VWP with other phrase shift, depending on drive voltage at the voltage 210.

In embodiments, as shown in FIG. 2A, the voltage 210 may be zero. The multiple liquid crystal molecules, e.g., the liquid crystal molecule 221, together may form a stretched shape of molecules to create an optical anisotropy in one orientation. Lights may go through the multiple liquid crystal molecules of the VWP 200.

In embodiments, as shown in FIG. 2B, the voltage 210 may be set to non-zero. The multiple liquid crystal molecules may change to another orientation, and may block lights. As a result, lights may not be able to go through the VWP 200 when the multiple liquid crystal molecules are in another orientation.

FIGS. 2A-2B only illustrate an example of a VWP. In some other embodiments, a VWP may have a different structure, e.g., a mechanically controllable VWP, an electrically controllable VWP, or a switchable VWP based on meta-surface, or some other kinds of VWP.

Figure 3:
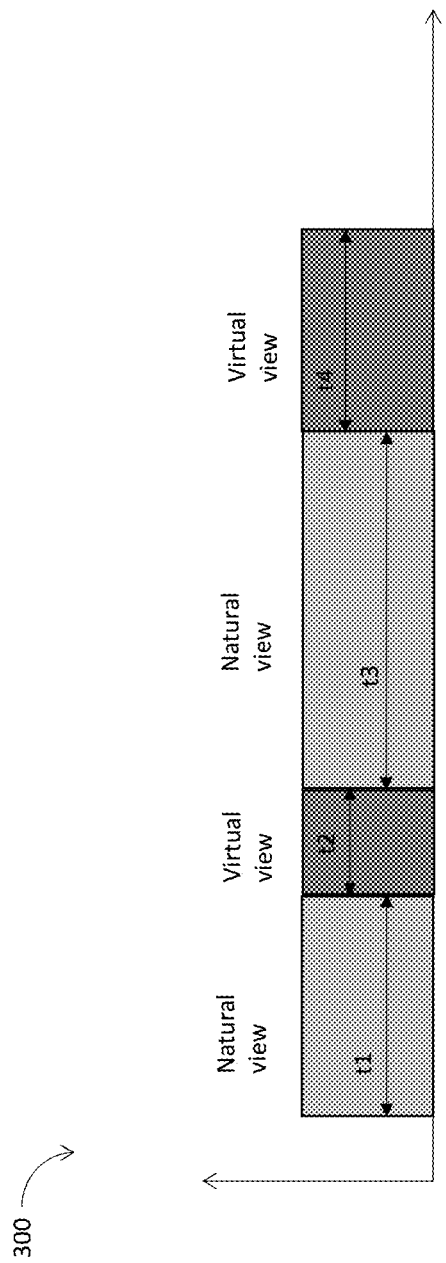
FIG. 3 illustrates an example time diagram of operations performed by an optical structure of an apparatus for mixed reality to present a natural view or a virtual view, in accordance with various embodiments.

FIG. 3 illustrates an example time diagram 300 of operations performed by an optical structure of an apparatus for MR to present a natural view or a virtual view, in accordance with various embodiments. In embodiments, the time diagram 300 may illustrate operations performed by the optical structure 111 of the apparatus 101 for MR shown in FIG. 1.

In embodiments, when an apparatus for MR is to operate in an AR mode, a controller may control an optical structure of the apparatus for MR to interlace a natural view and a virtual view. For example, when the apparatus 101 is to operate in an AR mode, the controller 115 may control the optical structure 111 by the electrical signal 131 to interlace a natural view and a virtual view by presenting a natural view for a time period t1, followed by a virtual view for a time period t2. Afterwards, the controller 115 may control the optical structure 111 to present a natural view for a time period t3, followed by a virtual view for a time period t4. The pattern of presenting a natural view followed by a virtual view may continue in a time frame determined by a user or a program. In embodiments, a time period for a natural view presentation, e.g., the time period t1, may be different from a time period for a virtual view presentation, e.g., the time period t2. Furthermore, the time period t1 may be different from the time period t3 or t4.

Figure 4:
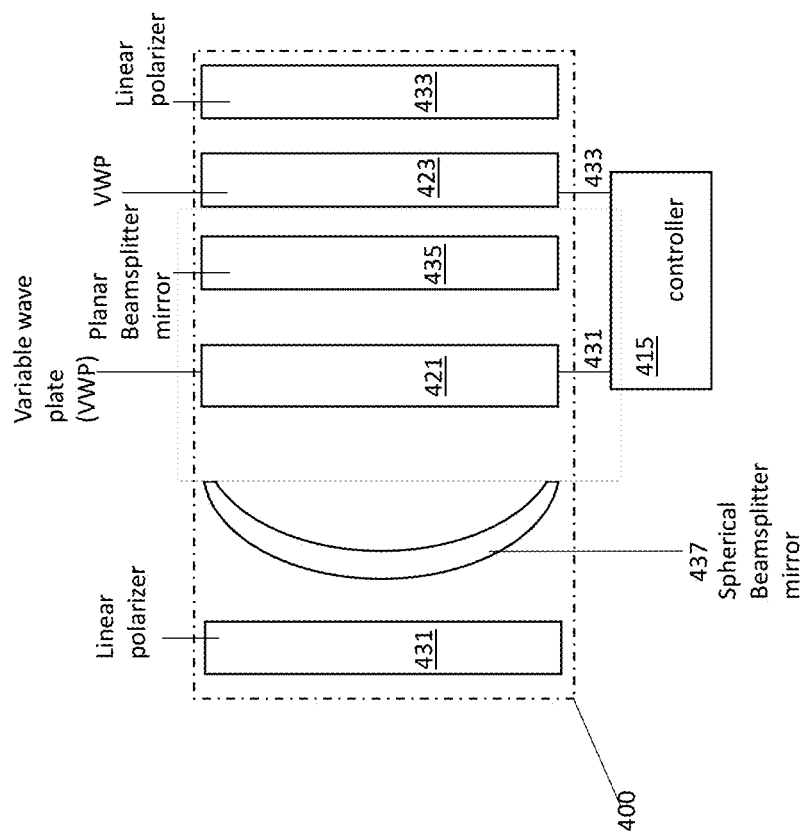
FIG. 4 illustrates an example diagram of an optical structure of an apparatus for mixed reality to operate in an AR mode or a VR mode, in accordance with various embodiments.

FIG. 4 illustrates an example diagram of an optical structure 400 of an apparatus for MR to operate in an AR mode or a VR mode, in accordance with various embodiments. In embodiments, the optical structure 400 may be similar to the optical structure 111 as shown in FIG. 1.

In embodiments, the optical structure 400 may include a first liner polarizer 431, a second liner polarizer 433, a VWP 421 and a VWP 423, where the VWP 421 and the VWP 423 may be placed between the first liner polarizer 431 and the second liner polarizer 433. The VWP 421 may be coupled to a controller 415 through an electrical signal 431, while the VWP 423 may be coupled to a controller 415 through an electrical signal 433. The optical structure 400 may further include a first beam splitter mirror 435 between the VWP 421 and the VWP 423, and a second beam splitter mirror 437 between the VWP 421 and the first liner polarizer 431. The first beam splitter mirror 435 may be a planar beam splitter mirror while the second beam splitter mirror 437 may be a spherical beam splitter mirror.

In embodiments, the optical structure 400 may act as a magnifying glass to present a virtual view when the VWP 421 and the VWP 423 may be set to quarter wave phase, which may be controlled by the electrical signal 431 and the electrical signal 433. The optical structure 400 may act as a magnifying glass when it is in an AR mode or in a VR mode. In addition, the optical structure 400 may act as a transparent glass to present a natural view when the VWP 421 and the VWP 423 may be set to half wave phase, which may be controlled by the electrical signal 431 and the electrical signal 433. The optical structure 400 may act as a transparent glass when it is in an AR mode.

FIGS. 5A-7C illustrate example diagrams of a display structure, e.g., a display structure 500, a display structure 600, or a display structure 700, of an apparatus for MR to operate in an AR mode or a VR mode, in accordance with various embodiments. In embodiments, the display structure 500, the display structure 600, or the display structure 700 may be similar to the display structure 113 as shown in FIG. 1.

In embodiments, a display structure, e.g., the display structure 500, the display structure 600, or the display structure 700, may include a transparent display, e.g., a transparent display 511, a transparent display 611, or a transparent display 711, and a switchable shutter, e.g., a switchable shutter 520, a switchable shutter 620, and a switchable shutter 720, attached to the transparent display. The transparent display 511, the transparent display 611, or the transparent display 711 may include a flat panel video display, a high resolution video display, an emissive display, an organic light emitting display (OLED), or a liquid crystal display (LCD). The switchable shutter, e.g., the switchable shutter 520, the switchable shutter 620, and the switchable shutter 720, may include a VWP.

Figure 5B:
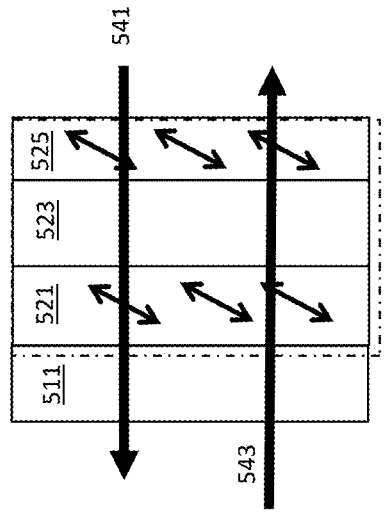
FIGS. 5A-5C illustrate example diagrams of a display structure of an apparatus for mixed reality to operate in an AR mode or a VR mode, in accordance with various embodiments.
Figure 5C:
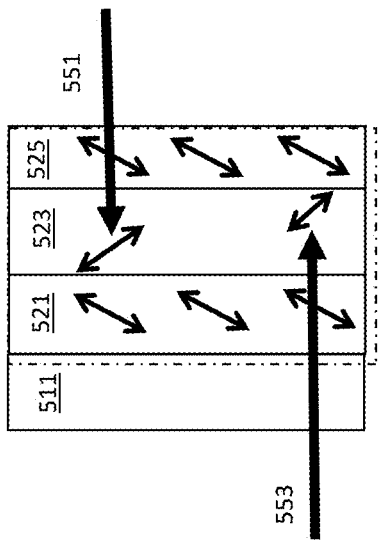
Figure 5A:
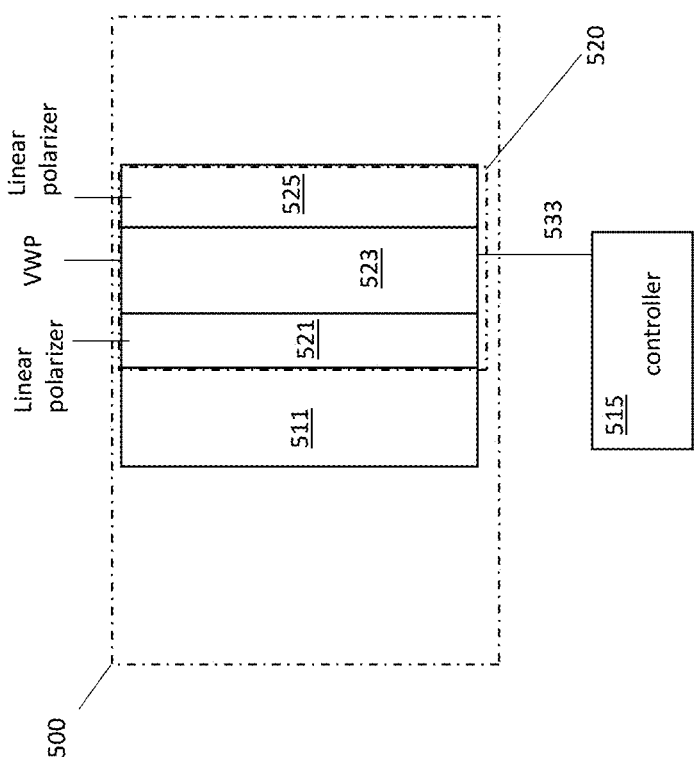

FIGS. 5A-5C illustrate example diagrams of a display structure 500 of an apparatus for MR to operate in an AR mode or a VR mode, in accordance with various embodiments. In embodiments, the display structure 500 may be similar to the display structure 113 as shown in FIG. 1.

In embodiments, as shown in FIG. 5A, the display structure 500 may include the transparent display 511 and the switchable shutter 520 attached to the transparent display 511. The switchable shutter 520 may include a liner polarizer 521 next to the transparent display 511, a VWP 523 next to the liner polarizer 521, and a liner polarizer 525 next to the VWP 523. Hence, the VWP 523 may be placed between two linear polarizers, e.g., the liner polarizer 521, and the liner polarizer 525. The liner polarizer 521 and the liner polarizer 525 may have parallel polarization axis, or perpendicular/crossed axis. The VWP 523 may be similar to the VWP 200 in FIG. 2. The VWP 523 may be controlled by a controller 515 through an electrical signal 533 to act as an opaque display when the apparatus containing the display structure 500 is operating in a VR mode, or a transparent display when the apparatus containing the display structure 500 is operating in an AR mode.

As shown in FIG. 5B, the display structure 500 may act as a transparent display when the VWP 523 may be set to 0 wave phase. When the phase of the VWP 523 may be set to 0 wave phase, a light 541 from right (ambient) may enter into the linear polarizar 525 and pass the VWP 523 without change and eventually pass the linear polarizar 523 and the transparent display 511. Similarly, a light 543 from the left may penetrate through all the layers, e.g., the transparent display 511, the linear polarizar 521, the VWP 523, and the linear polarizar 525, to reach the right.

As shown in FIG. 5C, the display structure 500 may act as an opaque display when the VWP 523 may be set to half wave phase. When the phase of VWP is set to half wave, a light 551 from the right may enter into the linear polarizar 525 and it's polarization axis is turned by 90 degree by the VWP 523. Similarly, a light 553 from the left may enter the transparent display 511 and the linear polarizar 521, and it's polarization axis is turned by 90 degree by the VWP 523.

Figure 6B:
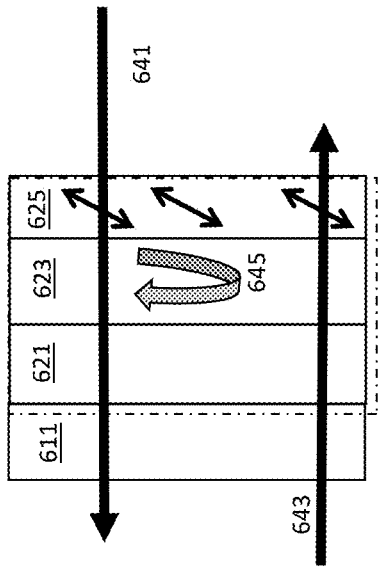
FIGS. 6A-6C illustrate example diagrams of another display structure of an apparatus for mixed reality to operate in an AR mode or a VR mode, in accordance with various embodiments.
Figure 6C:
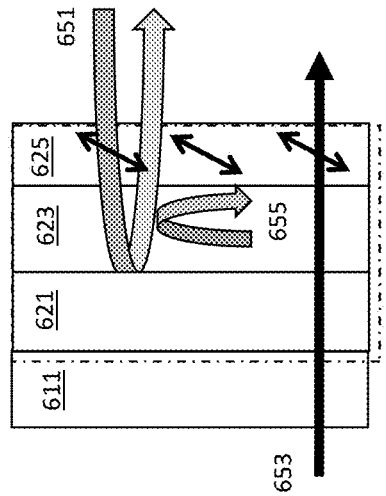
Figure 6A:
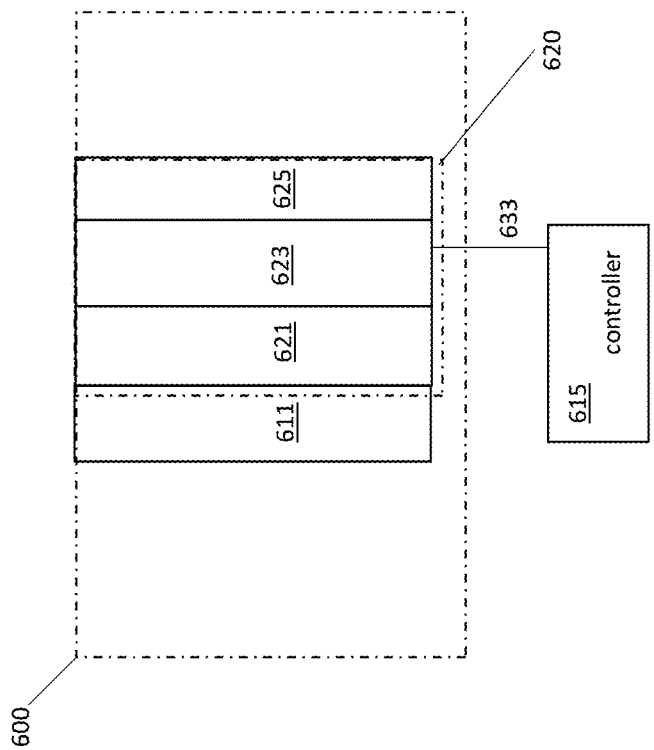

FIGS. 6A-6C illustrate example diagrams of another display structure 600 of an apparatus for MR to operate in an AR mode or a VR mode, in accordance with various embodiments. In embodiments, the display structure 600 may be similar to the display structure 113 as shown in FIG. 1.

In embodiments, as shown in FIG. 6A, the display structure 600 may include the transparent display 611 and the switchable shutter 620 attached to the transparent display 611. The switchable shutter 620 may include a cholesteric liquid crystal (CLC) 621 next to the transparent display 611, a VWP 623 next to the CLC 621, and a liner polarizer 625 next to the VWP 623. The VWP 623 may be similar to the VWP 200 in FIG. 2. The VWP 623 may be controlled by a controller 615 through an electrical signal 633 to act as an opaque display when the apparatus containing the display structure 600 is operating in a VR mode, or a transparent display when the apparatus containing the display structure 600 is operating in an AR mode.

As shown in FIG. 6B, the display structure 600 may act as a transparent display when the VWP 623 may be set to quarter wave phase. When the phase of the VWP 623 may be set to quarter wave phase, a light 641 from right (ambient) may enter into the linear polarizar 625 and may become linearly polarized. When the light 641 passes the VWP 623, the light 641 may change phase and turn into right-handed circularly polarized light 645. The CLC 621 may be configured in such a way that the right-handed circularly polarized light 645 may pass so that the display structure 600 may act as a transparent display. The light 643 from left may pass through the layers, e.g., the transparent display 611, the CLC 621, the VWP 623, and the linear polarizar 625, and reach to the right.

As shown in FIG. 6C, the display structure 600 may act as an opaque display when the VWP 623 may be set to 270 degrees wave phase. When the phase of the VWP 623 may be set to 270 degrees wave phase, a light 651 from right may enter into the linear polarizar 625, and may pass through the VWP 623 to turn into left-handed circularly polarized light 655, which may be reflected back by the CLC 621. Hence, the display structure 600 may become an opaque display for a human eye placed at the side of the transparent display 611. On the other hand, a light 653 from left may still pass through the layers, e.g., the transparent display 611, the CLC 621, the VWP 623, and the linear polarizar 625, and reach to the right, which may not be desirable for some applications.

FIGS. 7A-7C illustrate example diagrams of another display structure 700 of an apparatus for MR to operate in an AR mode or a VR mode, in accordance with various embodiments. In embodiments, the display structure 700 may be similar to the display structure 113 as shown in FIG. 1.

In embodiments, as shown in FIG. 7C, the display structure 700 may include the transparent display 711 and the switchable shutter 720 attached to the transparent display 711. The switchable shutter 720 may include a liner polarizer 721 next to the transparent display 711, a VWP 723 next to the liner polarizer 721, a CLC 725 next to the VWP 723, a VWP 727 next to the CLC 725, and a linear polarizer 729 next to the VWP 727. The VWP 723 and the VWP 727 may be similar to the VWP 200 in FIG. 2. The VWP 723 may be controlled by a controller 715 through an electrical signal 733, while the VWP 727 may be controlled by the controller 715 through an electrical signal 737. The display structure 700 may act as an opaque display when the apparatus containing the display structure 700 is operating in a VR mode, or a transparent display when the apparatus containing the display structure 700 is operating in an AR mode.

As shown in FIG. 7B, the display structure 700 may act as a transparent display when the VWP 723 and the VWP 727 may be set to quarter wave phase. When the phases of the VWP 723 and the VWP 727 may be set to quarter wave phase, a light 741 from right (ambient) may enter into the linear polarizar 729, pass the VWP 727, the CLC 725, the VWP 723, and the linear polarizar 721 without change and eventually pass the transparent display 711. Similarly, a light 743 from the left may penetrate through all the layers, e.g., the transparent display 711, the linear polarizar 721, the VWP 723, the CLC 725, the VWP 727, and the linear polarizar 729, to reach the right.

As shown in FIG. 7C, the display structure 700 may act as an opaque display when the VWP 723 and the VWP 727 may be set to 270 degrees wave phase. When the phases of the VWP 723 and the VWP 727 may be set to 270 degrees wave, a light 751 from the right may enter into the linear polarizar 729 and be blocked by the VWP 727. Similarly, a light 753 from the left may enter the transparent display 711 and the linear polarizar 721, and be blocked by the VWP 723.

Figure 8:
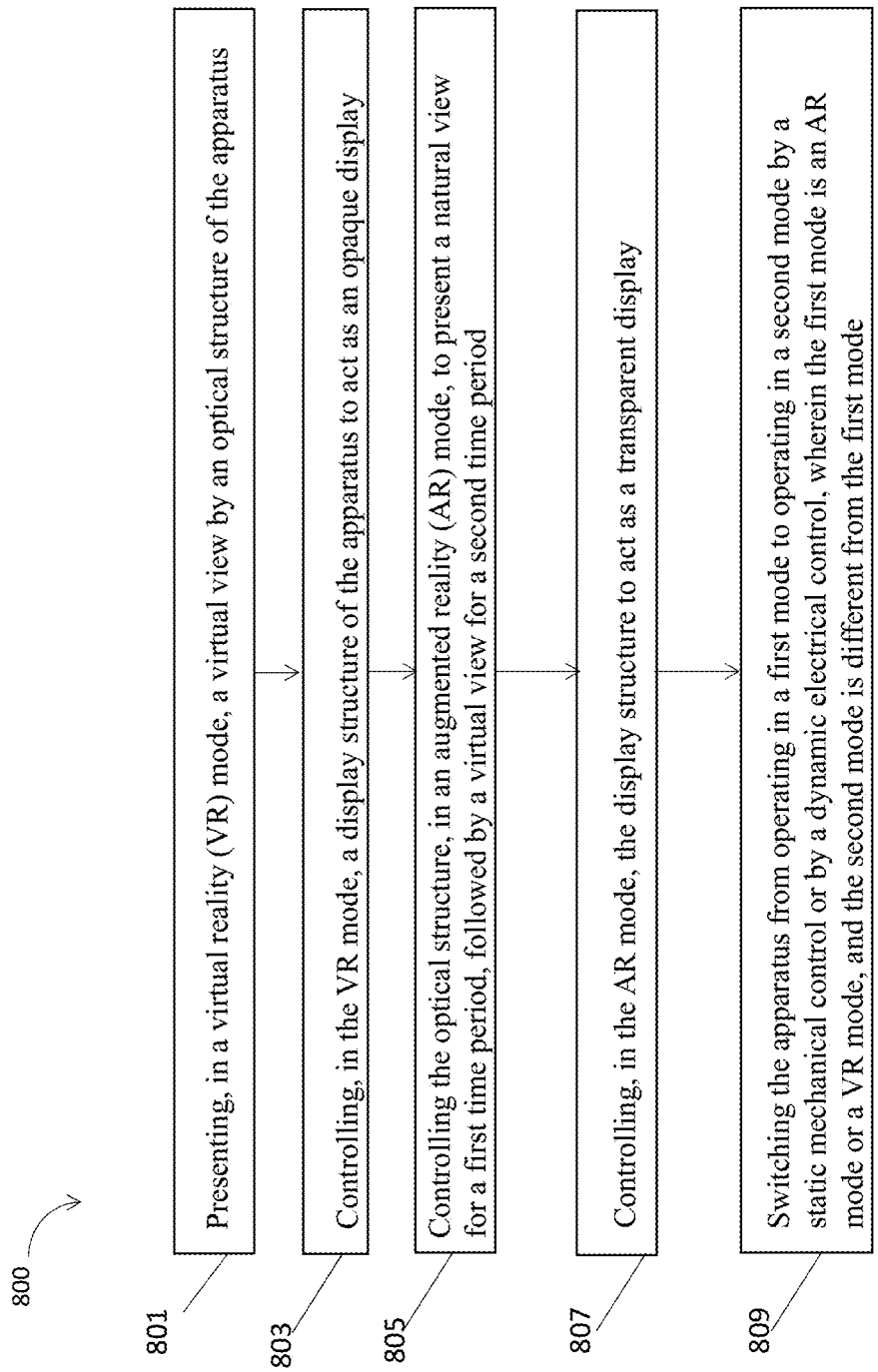
FIG. 8 illustrates an example process for an apparatus for mixed reality to operate in an AR mode or a VR mode, in accordance with various embodiments.

FIG. 8 illustrates an example process 800 for operating an apparatus for MR, in accordance with various embodiments. The process 800 may be applied to operate an apparatus for MR, e.g., the apparatus 101 as shown in FIG. 1. The apparatus may include an optical structure and a display structure. The optical structure may include a first variable wave plate, and the display structure may include a second variable wave plate. The optical structure may be controlled by a first electrical signal to act as a transparent glass to present a natural view, or to act as a magnifying glass to present a virtual view. The display structure may be controlled by a second electrical signal to act as an opaque display or a transparent display.

The process 800 may start at an interaction 801. During the interaction 801, the optical structure of the apparatus may present a virtual view in a VR mode. For example, at the interaction 801, the optical structure 111 of the apparatus 101 may present a virtual view in a VR mode.

During an interaction 803, the display structure of the apparatus may be controlled to act as an opaque display in the VR mode. For example, at the interaction 803, the display structure 113 of the apparatus 101 may be controlled to act as an opaque display in the VR mode.

During an interaction 805, the optical structure of the apparatus may be controlled in an AR mode to present a natural view for a first time period, followed by a virtual view for a second time period. For example, at the interaction 805, the optical structure 111 of the apparatus 101 may be controlled in an AR mode to present a natural view for a first time period, followed by a virtual view for a second time period. The interlacing of the natural view and the virtual view may be as shown in FIG. 3.

During an interaction 807, the display structure of the apparatus may be controlled to act as a transparent display in the AR mode. For example, at the interaction 807, display structure 113 of the apparatus 101 may be controlled act as a transparent display in the AR mode.

During an interaction 809, the apparatus may be switched from operating in a first mode to operating in a second mode by a static mechanical control or by a dynamic electrical control, where the first mode may be an AR mode or a VR mode, and the second mode may be different from the first mode. For example, at the interaction 809, the apparatus 101 may be switched from operating in an AR mode to a VR mode, or from a VR mode to an AR mode by the static mechanical control 117 or by a dynamic electrical control generated by the controller 115.

In some embodiments, the various interactions, e.g., the interaction 801, the interaction 803, the interaction 805, the interaction 807, and the interaction 809, may be ordered as shown in FIG. 8. In some other embodiments, various interactions of the process 800 may be performed in an order different from the one shown in FIG. 8. For example, the interaction 805 and the interaction 807 may be performed before the interaction 801 and the interaction 803. In addition, the interaction 801 and the interaction 803 may be synchronized and performed at a same time. Similarly, the interaction 805 and the interaction 807 may be synchronized and performed at a same time.

Figure 9:
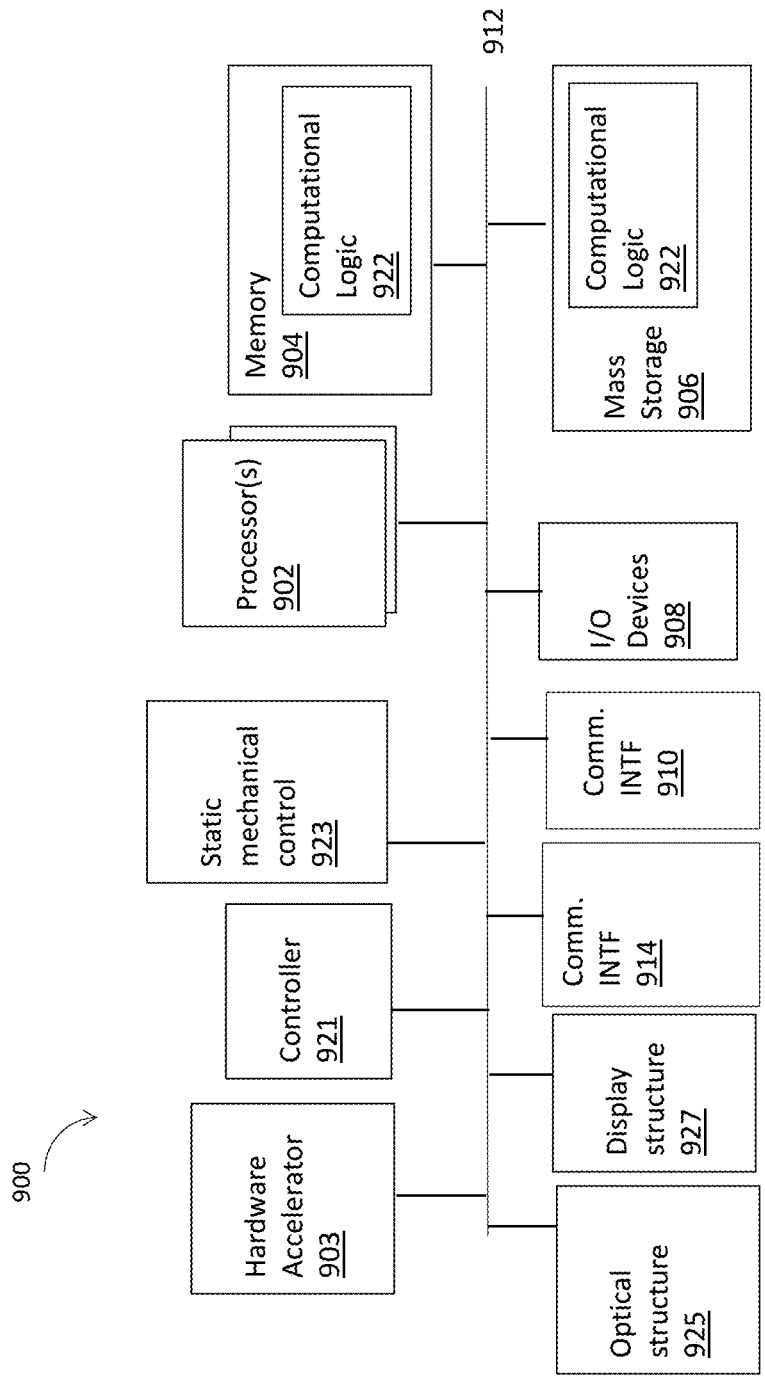
FIG. 9 illustrates an example device suitable for use to practice various aspects of the present disclosure, in accordance with various embodiments.

FIG. 9 illustrates an example device 900 that may be suitable as a device to practice selected aspects of the present disclosure. The device 900 may be an example of the apparatus 101 as shown in FIG. 1. As shown, the device 900 may include one or more processors 902, each having one or more processor cores, or and optionally, a hardware accelerator 903 (which may be an ASIC or a FPGA). In alternate embodiments, the hardware accelerator 903 may be part of processor 902, or integrated together on a SOC. Additionally, the device 900 may include a memory 904, which may be any one of a number of known persistent storage medium, and mass storage 906. In addition, the 900 may include input/output devices 908. Furthermore, the device 900 may include communication interfaces 910 and 914. Communication interfaces 910 and 914 may be any one of a number of known communication interfaces. The elements may be coupled to each other via system bus 912, which may represent one or more buses. In the case of multiple buses, they may be bridged by one or more bus bridges (not shown). In addition, the device 900 may include a controller 921, a static mechanical control 923, an optical structure 925, and a display structure 927, which may be an example of the controller 115, the static mechanical control 117, the optical structure 111, and display structure 113, as shown in FIG. 1.

Each of these elements may perform its conventional functions known in the art. In particular, memory 904 may include instructions, in response to execution by processor 902 to control the controller 115, the static mechanical control 117, the optical structure 111, and display structure 113, to operate the device 900, as described in connection with FIGS. 1-8, collectively referred to as computational logic 922 that provides the capability of the embodiments described in the current disclosure. The computational logic 922 may be implemented by assembler instructions supported by processor(s) 902 or high-level languages, such as, for example, C, that can be compiled into such instructions. Operations associated with variably sized transportation not implemented in software may be implemented in hardware, e.g., via hardware accelerator 903.

The number, capability and/or capacity of these elements 901-927 may vary, depending on the number of other devices the device 900 is configured to support. Otherwise, the constitutions of elements 901-927 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 10:
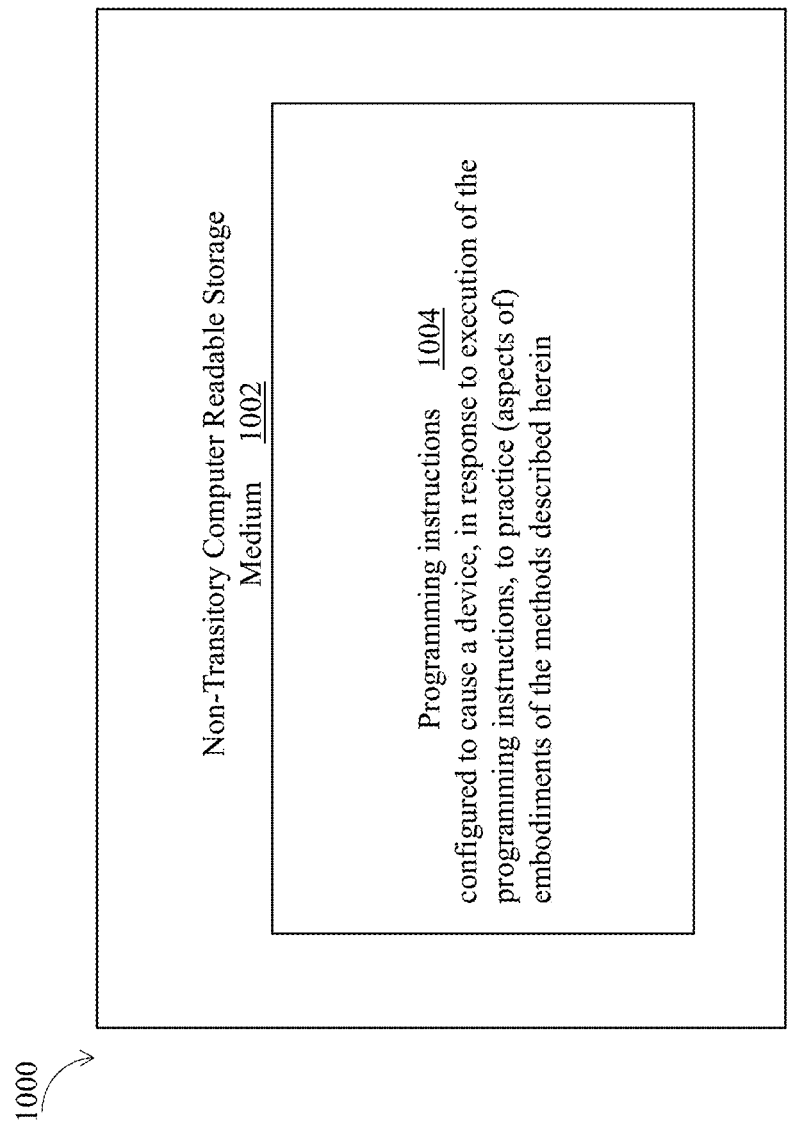
FIG. 10 illustrates a storage medium having instructions for practicing methods described with references to FIGS. 1-9, in accordance with various embodiments.

Furthermore, the present disclosure may take the form of a computer program product embodied in any tangible or non-transitory medium of expression having computer-usable program code embodied in the medium. FIG. 10 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1002 may include a number of programming instructions 1004. Programming instructions 1004 may be configured to enable a device, e.g., device 900, in response to execution of the programming instructions in an apparatus for MR, to perform, e.g., various operations associated with the process 800, as shown in FIG. 8.

In alternate embodiments, programming instructions 1004 may be disposed on multiple computer-readable non-transitory storage media 1002 instead. In alternate embodiments, programming instructions 1004 may be disposed on computer-readable transitory storage media 1002, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include an apparatus for mixed reality (MR), comprising: an optical structure, wherein the optical structure includes a first variable wave plate, the optical structure is to be controlled by a first electrical signal to act as a transparent glass to present a natural view, or to act as a magnifying glass to present a virtual view; a display structure, wherein the display structure includes a second variable wave plate, the display structure is to be controlled by a second electrical signal to act as an opaque display or a transparent display; and a controller coupled to the optical structure and the display structure, wherein the controller is to control the apparatus to operate in at least an augmented reality (AR) mode to interlace the natural view and the virtual view.

Example 2 may include the apparatus of example 1 and/or some other examples herein, wherein the optical structure further includes a third variable wave plate, the optical structure is to act as the magnifying glass to present the virtual view when the first variable wave plate and the third variable wave plate are set to quarter wave phase, and the optical structure is to act as the transparent glass to present the natural view when the first variable wave plate and the third variable wave plate are set to half wave phase.

Example 3 may include the apparatus of example 1 and/or some other examples herein, wherein the display structure is to act as the transparent display when the second variable wave plate is set to 0 wave phase, and the display structure is to act as the opaque display when the second variable wave plate is set to half wave phase.

Example 4 may include the apparatus of example 1 and/or some other examples herein, wherein the first variable wave plate or the second variable wave plate includes a liquid crystal based device, a mechanically tunable device, a switchable device based on meta-surface.

Example 5 may include the apparatus of example 1 and/or some other examples herein, wherein the controller is further to control the apparatus to operate in a virtual reality (VR) mode, and wherein: when the apparatus is to operate in the AR mode, the controller is to: control the optical structure, by the first electrical signal, to interlace the natural view and the virtual view by presenting the natural view for a first time period, followed by the virtual view for a second time period, and control the display structure, by the second electrical signal, to act as the transparent display, and when the apparatus is to operate in the VR mode, the controller is to: control the optical structure, by the first electrical signal, to present the virtual view, and control the display structure, by the second electrical signal, to act as an opaque display.

Example 6 may include the apparatus of any one of examples 1-5 and/or some other examples herein, wherein a length of the first time period is different from a length of the second time period.

Example 7 may include the apparatus of any one of examples 1-5 and/or some other examples herein, wherein when the apparatus is to operate in the AR mode, the controller is to synchronize the first electrical signal for the optical structure to interlace the natural view and the virtual view, and the second electrical signal for the display structure to act as the transparent display.

Example 8 may include the apparatus of any one of examples 1-5 and/or some other examples herein, wherein the controller is to switch the apparatus from operating in a first mode to operating in a second mode by a static mechanical control or by a dynamic electrical control, wherein the first mode is the AR mode or the VR mode, and the second mode is different from the first mode.

Example 9 may include the apparatus of any one of examples 1-5 and/or some other examples herein, wherein the display structure includes a transparent display and a switchable shutter attached to the transparent display, wherein the switchable shutter includes the second variable wave plate.

Example 10 may include the apparatus of example 9 and/or some other examples herein, wherein the transparent display includes a flat panel video display, a high resolution video display, an emissive display, an organic light emitting display (OLED), or a liquid crystal display (LCD).

Example 11 may include the apparatus of example 9 and/or some other examples herein, wherein the switchable shutter includes a first liner polarizer next to the transparent display, the second variable wave plate next to the first liner polarizer, and a second liner polarizer next to the second variable wave plate.

Example 12 may include the apparatus of example 9 and/or some other examples herein, wherein the switchable shutter includes a cholesteric liquid crystal (CLC) next to the transparent display, the second variable wave plate next to the CLC, and a liner polarizer next to the second variable wave plate.

Example 13 may include the apparatus of example 9 and/or some other examples herein, wherein the switchable shutter includes a first liner polarizer next to the transparent display, the second variable wave plate next to the first liner polarizer, a cholesteric liquid crystal (CLC) next to the second variable wave plate, a third variable wave plate next to the CLC, and a second liner polarizer next to the third variable wave plate.

Example 14 may include a method for operating an apparatus for mixed reality (MR), comprising: presenting, in a virtual reality (VR) mode, a virtual view by an optical structure of the apparatus; controlling, in the VR mode, a display structure of the apparatus to act as an opaque display; controlling the optical structure, in an augmented reality (AR) mode, to present a natural view for a first time period, followed by the virtual view for a second time period; and controlling, in the AR mode, the display structure to act as a transparent display; wherein the optical structure includes a first variable wave plate, the optical structure is to be controlled by a first electrical signal to act as a transparent glass to present the natural view, or to act as a magnifying glass to present the virtual view; and wherein the display structure includes a second variable wave plate, the display structure is to be controlled by a second electrical signal to act as the opaque display or the transparent display.

Example 15 may include the method of example 14 and/or some other examples herein, wherein the optical structure further includes a third variable wave plate, the optical structure is to act as the magnifying glass to present the virtual view when the first variable wave plate and the third variable wave plate are set to quarter wave phase, and the optical structure is to act as the transparent glass to present the natural view when the first variable wave plate and the third variable wave plate are set to half wave phase.

Example 16 may include the method of any one of examples 14-15 and/or some other examples herein, wherein the display structure is to act as the transparent display when the second variable wave plate is set to 0 wave phase, and the display structure is to act as the opaque display when the second variable wave plate is set to half wave phase.

Example 17 may include the method of any one of examples 14-15 and/or some other examples herein, further comprising: switching the apparatus from operating in a first mode to operating in a second mode by a static mechanical control or by a dynamic electrical control, wherein the first mode is the AR mode or the VR mode, and the second mode is different from the first mode.

Example 18 may include the method of any one of examples 14-15 and/or some other examples herein, wherein the display structure includes a transparent display and a switchable shutter attached to the transparent display, wherein the switchable shutter includes the second variable wave plate.

Example 19 may include an apparatus for mixed reality (MR), comprising: an optical structure, wherein the optical structure includes a first variable wave plate, the optical structure is to be controlled by an electrical signal to act as a transparent glass to present a natural view, or to act as a magnifying glass to present a virtual view; and a controller coupled to the optical structure, wherein the controller is to control the optical structure, by the electrical signal, to interlace the natural view and the virtual view by presenting the natural view for a first time period, followed by the virtual view for a second time period.

Example 20 may include the apparatus of example 19 and/or some other examples herein, wherein the optical structure further includes a second variable wave plate, the optical structure is to act as the magnifying glass to present the virtual view when the first variable wave plate and the second variable wave plate are set to quarter wave phase, and the optical structure is to act as the transparent glass to present the natural view when the first variable wave plate and the second variable wave plate are set to half wave phase.

Example 21 may include the apparatus of any one of examples 19-20 and/or some other examples herein, wherein the optical structure further includes a first liner polarizer, a second liner polarizer, and a second variable wave plate, and wherein the first variable wave plate and the second variable are placed between the first liner polarizer and the second liner polarizer.

Example 22 may include the apparatus of example 21 and/or some other examples herein, wherein the optical structure further includes a first beam splitter mirror between the first variable wave plate and the second variable wave plate, and a second beam splitter mirror between the first variable wave plate and the first liner polarizer.

Example 23 may include the apparatus of any one of examples 19-20 and/or some other examples herein, further comprising: a display structure coupled to the controller, wherein the display structure includes a third variable wave plate, the display structure is to be controlled by another electrical signal to act as an opaque display or a transparent display, wherein the controller is to control the apparatus to operate in an augmented reality (AR) mode or a virtual reality (VR) mode, and wherein: when the apparatus is to operate in the AR mode, the controller is to: control the optical structure, by the electrical signal, to interlace the natural view and the virtual view, and control the display structure, by another electrical signal, to act as the transparent display, and when the apparatus is to operate in the VR mode, the controller is to: control the optical structure, by the electrical signal, to present the virtual view, and control the display structure, by another electrical signal, to act as the opaque display.

Example 24 may include the apparatus of example 23 and/or some other examples herein, wherein the display structure includes a transparent display and a switchable shutter attached to the transparent display, wherein the switchable shutter includes the third variable wave plate.

Example 25 may include the apparatus of example 23 and/or some other examples herein, wherein the display structure is to act as the transparent display when the third variable wave plate is set to 0 wave phase, and the display structure is to act as the opaque display when the third variable wave plate is set to half wave phase.

Example 26 may include one or more computer-readable media having instructions for a vehicle for variably sized transportation, upon execution of the instructions by one or more processors, to perform the method of any one of claims 14-18.

Example 27 may include an apparatus for mixed reality (MR), comprising: means for presenting, in a virtual reality (VR) mode, a virtual view by an optical structure of the apparatus; means for controlling, in the VR mode, a display structure of the apparatus to act as an opaque display; means for controlling the optical structure, in an augmented reality (AR) mode, to present a natural view for a first time period, followed by the virtual view for a second time period; and means for controlling, in the AR mode, the display structure to act as a transparent display; wherein the optical structure includes a first variable wave plate, the optical structure is to be controlled by a first electrical signal to act as a transparent glass to present the natural view, or to act as a magnifying glass to present the virtual view; and wherein the display structure includes a second variable wave plate, the display structure is to be controlled by a second electrical signal to act as the opaque display or the transparent display.

Example 28 may include the apparatus of example 27 and/or some other examples herein, wherein the optical structure further includes a third variable wave plate, the optical structure is to act as the magnifying glass to present the virtual view when the first variable wave plate and the third variable wave plate are set to quarter wave phase, and the optical structure is to act as the transparent glass to present the natural view when the first variable wave plate and the third variable wave plate are set to half wave phase.

Example 29 may include the apparatus of any one of examples 27-28 and/or some other examples herein, wherein the display structure is to act as the transparent display when the second variable wave plate is set to 0 wave phase, and the display structure is to act as the opaque display when the second variable wave plate is set to half wave phase.

Example 30 may include the apparatus of any one of examples 27-28 and/or some other examples herein, further comprising: means for switching the apparatus from operating in a first mode to operating in a second mode by a static mechanical control or by a dynamic electrical control, wherein the first mode is the AR mode or the VR mode, and the second mode is different from the first mode.

Example 31 may include the apparatus of any one of examples 27-28 and/or some other examples herein, wherein the display structure includes a transparent display and a switchable shutter attached to the transparent display, wherein the switchable shutter includes the second variable wave plate.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. An apparatus for mixed reality (MR), comprising:
an optical structure dynamically configurable to operate in a first optical setting to present a natural view, or to operate in a second optical setting, different from the first optical setting, to present a virtual view; and
a controller coupled to the optical structure to dynamically configure the optical structure to alternate between operating in the first optical setting to present the natural view and operating in the second optical setting to present the virtual view between different time periods, while the apparatus is in an augmented reality (AR) mode.

2. The apparatus of claim 1, wherein the optical structure includes a first and a second variable wave plate, and the controller is to dynamically configure the first and second variable wave plates to operate at quarter wave phase to operate the optical structure as a magnifying glass to present the virtual view, and dynamically configure the first and second variable wave plates to operate at half wave phase to operate the optical structure as a transparent glass to present the natural view.

3. The apparatus of claim 1, further comprising a display structure dynamically configurable to operate in a third optical setting to act as an opaque display or to operate in a fourth optical setting, different from the third optical setting, to act as a transparent display, wherein the display structure includes a variable wave plate, and the controller is to dynamically configure the variable wave plates is operate at 0 wave phase to operate the display structure as a transparent display, and to dynamically configure the variable wave plate to operate at half wave phase to operate the display structure as an opaque display.

4. The apparatus of claim 3, wherein the variable wave plate includes a liquid crystal based device, a mechanically tunable device, or a switchable device based on meta-surface.

5. The apparatus of claim 3, wherein the apparatus is to further operate in a virtual reality (VR) mode, and wherein:
when the apparatus is to operate in the AR mode during a first time period, the controller is to:
dynamically configure the optical structure to operate in the first optical setting for one or more portions of the first time period, followed by operation in the second optical setting in other portions of the time period to present the natural view during the one or more portions of the first time period, followed by the virtual view during the other portions of the first time period, to interlace the natural view and the virtual view, and
dynamically configure the display structure to operate in the fourth optical setting to operate as the transparent display during the first time period, and
when the apparatus is to operate in the VR mode in a second time period, the controller is to:
dynamically configure the optical structure to operate in the second optical setting during the second time period to present the virtual view, and
dynamically configure the display structure to operate in the third optical setting during the second time period to act as the opaque display.

6. The apparatus of claim 5, wherein a length of one of the one or more portions of the first time period is different from a length of one of the other portions of the first time period.

7. The apparatus of claim 5, wherein the controller is arranged to dynamically configure the optical structure and the display structure with a first and a second electrical signal, respectively, and wherein when the apparatus is to operate in the AR mode, the controller synchronizes the first electrical signal for the optical structure to alternate between the natural view and the virtual view, and the second electrical signal for the display structure to act as the transparent display.

8. The apparatus of claim 5, further comprising a static mechanical control or by a dynamic electrical control coupling the controller to the optical structure and the display structure; and wherein the controller is arranged to switch the apparatus from operating in a first mode to operating in a second mode by the static mechanical control or by the dynamic electrical control, the first mode being the AR mode or the VR mode, and the second mode being different from the first mode.

9. The apparatus of claim 3, wherein the display structure includes a transparent screen and a switchable shutter attached to the transparent screen, the switchable shutter having a variable wave plate.

10. The apparatus of claim 9, wherein the transparent display includes a flat panel video display, a high resolution video display, an emissive display, an organic light emitting display (OLED), or a liquid crystal display (LCD).

11. The apparatus of claim 9, wherein the switchable shutter includes a first liner polarizer next to the transparent display, with the variable wave plate being next to the first liner polarizer, and a second liner polarizer next to the second variable wave plate.

12. The apparatus of claim 9, wherein the switchable shutter includes a cholesteric liquid crystal (CLC) next to the transparent display, with the variable wave plate being next to the CLC, and a liner polarizer next to the second variable wave plate.

13. The apparatus of claim 9, wherein the switchable shutter includes a first liner polarizer next to the transparent display, with the variable wave plate being next to the first liner polarizer, a cholesteric liquid crystal (CLC) next to the variable wave plate, another variable wave plate next to the CLC, and a second liner polarizer next to the other variable wave plate.

14. A method for operating an apparatus for mixed reality (MR), comprising:
    placing the apparatus in a virtual reality (VR) mode, and operating an optical structure of the apparatus to present a virtual view;
    controlling, while in the VR mode, a display structure of the apparatus to operate at a first level of transparency;
    switching the apparatus from the VR mode to an augmented reality (AR) mode, and operating the optical structure to dynamically alternate between presentation of a natural view and between presentation of the virtual view in different time periods; and
    while in the AR mode, controlling the display structure to operate at a second level of transparency that is more transparent than the first level of transparency.

15. The method of claim 14, wherein operating the optical structure to present a virtual view comprises operating a pair of variable wave plates of the optical structure with a first optical wave setting to operate as a magnifying glass, and operating the optical structure to present a natural view comprises operating the pair of variable wave plates with a second optical wave setting to operate the optical structure as a transparent glass.

16. The method of claim 14, wherein controlling the display structure to operate at the first level of transparency comprises controlling a variable wave plate of display structure to operate at a first optical wave setting, and controlling the display structure to operate at the second level of transparency comprises controlling the variable wave plate to operate at a second optical wave setting.

17. The method of claim 14, wherein
    switching the apparatus from the VR mode to the AR mode comprises switching the apparatus with a static mechanical control or with a dynamic electrical control.

18. The method of claim 14, wherein the display structure includes a transparent screen and a switchable shutter attached to the transparent screen, the switchable shutter having a variable wave plate, and controlling the display structure to operate as at the second level of transparency comprises controlling the variable wave plate.

19. An apparatus for mixed reality (MR), comprising:
    an optical structure, including a first variable wave plate dynamically configurable to cause the optical structure to act as a transparent glass to present a natural view, or to act as a magnifying glass to present a virtual view; and
    a controller coupled to the optical structure, to dynamically configure the optical structure to alternate between presentation of the natural view and presentation of the virtual view in different time periods, while the apparatus is in an augmented reality (AR) mode.

20. The apparatus of claim 19, wherein the optical structure further includes a second variable wave plate, and the controller is arranged to dynamically configure the first variable wave plate and the second variable wave plate to operate at quarter wave phase to operate the optical structure as the magnifying glass to present the virtual view, and to dynamically configure the first variable wave plate and the second variable wave plate to operate at half wave phase to operate the optical structure as the transparent glass to present the natural view.

21. The apparatus of claim 19, wherein the optical structure further includes a first liner polarizer, a second liner polarizer, and a second variable wave plate, and wherein the first variable wave plate and the second variable wave plate are placed between the first liner polarizer and the second liner polarizer.

22. The apparatus of claim 21, wherein the optical structure further includes a first beam splitter mirror between the first variable wave plate and the second variable wave plate, and a second beam splitter mirror between the first variable wave plate and the first liner polarizer.

23. The apparatus of claim 19, further comprising:
    a display structure coupled to the controller, dynamically configurable to operate as an opaque display or a transparent display,
    wherein the controller is to control the apparatus to operate in an augmented reality (AR) mode or a virtual reality (VR) mode, and wherein:
    to operate the apparatus in the AR mode, the controller is arranged to:
        control the optical structure to alternate between the natural view and the virtual view in different time periods, and
        control the display structure to act as the transparent display, and to operate the apparatus in the VR mode, the controller is arranged to:
        control the optical structure to present the virtual view, and
        control the display structure to act as the opaque display.

24. The apparatus of claim 23, wherein the display structure includes a transparent screen and a switchable shutter attached to the transparent screen, wherein the switchable shutter includes a variable wave plate.

25. The apparatus of claim 24, wherein the display structure is to act as the transparent display when the variable wave plate is dynamically configured to operate with 0 wave phase, and the display structure is to act as the opaque display when the variable wave plate is dynamically configured to operate with half wave phase.

* * * * *

UNITED STATES PATENT AND TRADEMARK OFFICE
CERTIFICATE OF CORRECTION

PATENT NO. : 11,002,994 B2  
APPLICATION NO. : 16/555844  
DATED : May 11, 2021  
INVENTOR(S) : Jun Jiang et al.

Page 1 of 1

It is certified that error appears in the above-identified patent and that said Letters Patent is hereby corrected as shown below:

In the Claims

Column 20  
Lines 19-20, "...the controller is to dynamically configure the variable wave plates is operate at 0 wave phase to operate..." should read – "...the controller is to dynamically configure the variable wave plate to operate at 0 wave phase to operate..."

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*